United States Patent
Rudolf et al.

(10) Patent No.: US 8,077,683 B2
(45) Date of Patent: Dec. 13, 2011

(54) METHOD AND SYSTEM FOR PERFORMING PEER-TO-PEER COMMUNICATION BETWEEN STATIONS WITHIN A BASIC SERVICE SET

(75) Inventors: Marian Rudolf, Montreal (CA); Paul Marinier, Brossard (CA); Vincent Roy, Montreal (CA); Maged M. Zaki, Pierrefonds (CA)

(73) Assignee: InterDigital Technology Corporation, Wilmington, DE (US)

( * ) Notice: Subject to any disclaimer, the term of this patent is extended or adjusted under 35 U.S.C. 154(b) by 565 days.

(21) Appl. No.: 11/554,772

(22) Filed: Oct. 31, 2006

(65) Prior Publication Data

US 2007/0104138 A1  May 10, 2007

Related U.S. Application Data

(60) Provisional application No. 60/733,217, filed on Nov. 3, 2005.

(51) Int. Cl.
*H04W 4/00* (2009.01)
(52) U.S. Cl. ........ 370/338; 370/329; 370/328; 370/349; 370/229; 455/436; 455/434
(58) Field of Classification Search .................. 370/338, 370/329, 328, 333, 349, 252, 229; 455/436, 455/434
See application file for complete search history.

(56) References Cited

U.S. PATENT DOCUMENTS

| | | | |
|---|---|---|---|
| 5,819,177 A | 10/1998 | Vucetic et al. | |
| 7,590,086 B2 * | 9/2009 | Olkkonen et al. | 370/328 |
| 2002/0085719 A1 * | 7/2002 | Crosbie | 380/248 |
| 2002/0163933 A1 * | 11/2002 | Benveniste | 370/465 |
| 2003/0054850 A1 * | 3/2003 | Masseroni et al. | 455/522 |
| 2003/0142652 A1 * | 7/2003 | Ting et al. | 370/338 |
| 2003/0174682 A1 * | 9/2003 | Barker, Jr. | 370/338 |

(Continued)

FOREIGN PATENT DOCUMENTS

WO  2004/032536  4/2004

(Continued)

OTHER PUBLICATIONS

IEEE Standard for Information Technology—Telecommunications and information exchange between systems—Local and metropolitan area networks; Specific requirements, Part 11: Wireless LAN Medium Access Control (MAC) and Physical Layer (PHY) Specifications: Amendment: Medium Access Control (MAC) Quality of Service (Qos) Enhancements, IEEE 802.11e/D13.0; p. 43, lines 11-17; pp. 60-61; p. 67, paragraph 8.5.5.1; pp. 117-121; pp. 148-150; p. 152, paragraph 11.7.5; Jan. 2005.

*Primary Examiner* — Nick Corsaro
*Assistant Examiner* — Mahendra Patel
(74) *Attorney, Agent, or Firm* — Volpe and Koenig, P.C.

(57) ABSTRACT

A method and system for performing peer-to-peer wireless communication between stations (STAs) within a basic service set (BSS) while maintaining connectivity with an access point (AP) in the BSS are disclosed. A source STA, an AP and a destination STA negotiate a direct link setup (DLS) channel for performing peer-to-peer communication between the source STA and the destination STA. The DLS channel may be different from a BSS channel used for communication between the AP and each of the STAs. The source STA and the destination STA then perform peer-to-peer communication on the negotiated DLS channel.

50 Claims, 1 Drawing Sheet

U.S. PATENT DOCUMENTS

| | | | |
|---|---|---|---|
| 2004/0004951 A1* | 1/2004 | Zuniga et al. | 370/338 |
| 2004/0103278 A1* | 5/2004 | Abhishek et al. | 713/160 |
| 2004/0121766 A1* | 6/2004 | Benson et al. | 455/425 |
| 2005/0025182 A1* | 2/2005 | Nazari | 370/469 |
| 2005/0052998 A1* | 3/2005 | Oliver et al. | 370/231 |
| 2005/0053015 A1* | 3/2005 | Jin et al. | 370/254 |
| 2005/0088980 A1* | 4/2005 | Olkkonen et al. | 370/255 |
| 2005/0226183 A1* | 10/2005 | Penumetsa | 370/329 |
| 2005/0254449 A1 | 11/2005 | Halfmann et al. | |
| 2006/0165035 A1* | 7/2006 | Chandra et al. | 370/329 |
| 2006/0239275 A1* | 10/2006 | Zlateff et al. | 370/400 |
| 2007/0097934 A1* | 5/2007 | Walker et al. | 370/338 |
| 2007/0233840 A1* | 10/2007 | Alstrup et al. | 709/223 |
| 2008/0305744 A1* | 12/2008 | Furuskar et al. | 455/67.11 |
| 2009/0310578 A1* | 12/2009 | Convertino et al. | 370/338 |

FOREIGN PATENT DOCUMENTS

| | | |
|---|---|---|
| WO | 2004/057806 | 7/2004 |

* cited by examiner

METHOD AND SYSTEM FOR PERFORMING PEER-TO-PEER COMMUNICATION BETWEEN STATIONS WITHIN A BASIC SERVICE SET

CROSS REFERENCE TO RELATED APPLICATION

This application claims the benefit of U.S. Provisional Application Ser. No. 60/733,217 filed Nov. 3, 2005, which is incorporated by reference as if fully set forth.

FIELD OF INVENTION

The present invention is related to a wireless communication system. More particularly, the present invention is related to a method and system for performing peer-to-peer wireless communication between stations (STAs) within a basic service set (BSS) while maintaining connectivity with an access point (AP) in the BSS.

BACKGROUND

There are two different types of wireless local area network (WLAN). One is an infrastructure mode WLAN which includes an AP and a STA, and the other is an ad hoc mode WLAN which includes only peer STAs. The ad hoc mode WLAN is also called an independent BSS (IBSS).

FIG. 1 shows a conventional infrastructure mode WLAN 100 including two BSSs 112a, 112b which are connected via a distribution system (DS) 114. The BSSs are served by APs 102a, 102b, respectively. In the infrastructure mode WLAN 100, all packets generated by a source STA, such as STA 104a, is first sent to the AP 102a. If the packets are destined outside the BSS 112a, the AP 102a forwards the packets through the DS 114. If the packets are destined to another STA, such as STA 102b, inside the BSS 112a, the AP 102a, after receiving the packets from the source STA 104a, forwards the packets over the air interface to the destination STA 104b in the BSS 112a. Therefore, the same packets are sent twice over the air.

Duplicating such peer-to-peer traffic, (i.e., sending the packets sent from one STA in the BSS to another STA in the same BSS), is an inefficient usage of the wireless medium since any peer-to-peer STA traffic within the BSS requires twice as much bandwidth compared to traffic to or from a STA outside the BSS.

In order to solve this problem, the IEEE 802.11e provides a feature called direct link setup (DLS). With the IEEE 802.11e DLS, a STA first initiates a direct link through the AP and exchanges packets with other STA directly. However, in an IEEE 802.11-based WLAN, STAs within a BSS share the same frequency channel, (i.e., BSS channel), to communicate with each other, and all traffic, (both traffic between a STA and an AP and traffic between STAs), must still be sent over the BSS channel. With this limitation to a single BSS channel, the amount of peer-to-peer traffic in a BSS that can be supported by a single frequency channel is limited by the overall throughput of the BSS. For example, a conventional IEEE 802.11g or 802.11a BSS will not be able to support more than 30-32 spore Mbps at the medium access control (MAC) level (corresponding to a net data rate of 54 Mbps at the physical layer) aggregate throughput.

Furthermore, it is difficult to manage peer-to-peer links in a conventional IEEE 802-11e DLS system. For conventional BSS traffic, (i.e., traffic between STAs and AP), the overall BSS radio range, (where packets can be reliably received), is essentially determined by the AP's radio range. An interference range of the BSS, (where packets cannot be reliably received, but will still create interference to other STAs operating on the same channel), is determined by both the STA's range and the AP's range. However, with DLS, depending on the position of the participating STAs, the interference range associated by a pair of STAs can be quite different to the interference range of the AP. Interaction and impacts of these different interference ranges is complex and has been shown to have large negative effects on network capacity in IEEE 802.11 systems.

Moreover, with conventional IEEE 802.11 systems, peer-to-peer traffic cannot be off-loaded to a different channel than the BSS channel without the involved peer-to-peer STAs losing layer 2 connectivity to the network. Trading off layer 2 connectivity for capacity is not necessarily an attractive alternative, because many of the devices in a WLAN environment need IP connectivity to support various services. For example, a TV receiving a video playback from a DVD player could not download online DVD info, titles, recommendations, or the like during playback. Losing layer 2 connectivity to the AP implies losing the possibility of supporting all services except the on-going peer-to-peer services.

Therefore, it is desirable to provide a method and system for peer-to-peer wireless communication between STAs within the BSS while maintaining layer 2 connectivity and manageability with an AP in the BSS.

SUMMARY

The present invention is related to a method and system for performing peer-to-peer wireless communication between STAs in the same BSS while maintaining layer 2 connectivity and manageability with an AP in the BSS. A source STA, an AP and a destination STA negotiate a DLS channel for performing peer-to-peer communication between the source STA and the destination STA. The DLS channel may be different from a BSS channel used for communication between the AP and each of the STAs. The source STA and the destination STA then perform peer-to-peer communication on the negotiated DLS channel. The peer-to-peer traffic is offloaded to a different channel, (i.e., DLS channel), than the BSS channel while still ensuring layer 2 connectivity from the AP to the STAs.

DETAILED DESCRIPTION OF THE PREFERRED EMBODIMENTS

When referred to hereafter, the terminology "STA" includes but is not limited to a user equipment (UE), a wireless transmit/receive unit (WTRU), a fixed or mobile subscriber unit, a pager, or any other type of device capable of operating in a wireless environment. When referred to hereafter, the terminology "AP" includes but is not limited to a base station, a Node-B, a site controller, or any other type of interfacing device in a wireless environment.

The features of the present invention may be incorporated into an integrated circuit (IC) or be configured in a circuit comprising a multitude of interconnecting components.

When referred to hereinafter, the terminology "BSS channel" refers to the channel used by the AP in the BSS to communicate with its associated STAs and the terminology "DLS channel" refers to the channel that are used by the STAs for their peer-to-peer communication. In the conventional WLAN system, (including IEEE 802-11e DLS system), the BSS channel is same as the DLS channel. In accordance with the present invention, the BSS channel may be different from the DLS channel and there may be multiple DLS channels in the BSS. Alternatively, more than one particular pair of STAs may use one DLS channel.

In accordance with the present invention, a pair of STAs and an AP negotiate a DLS channel for peer-to-peer communication between the STAs. Once the DLS channel is negotiated, the STAs perform peer-to-peer communication on the negotiated DLS channel. The STAs communicate with each other directly via the negotiated DLS channel while maintaining their BSS association with the AP at all times. Layer 2 connectivity between the AP and each of the STAs is ensured so that the AP retains full control over the STAs.

Figure 1:
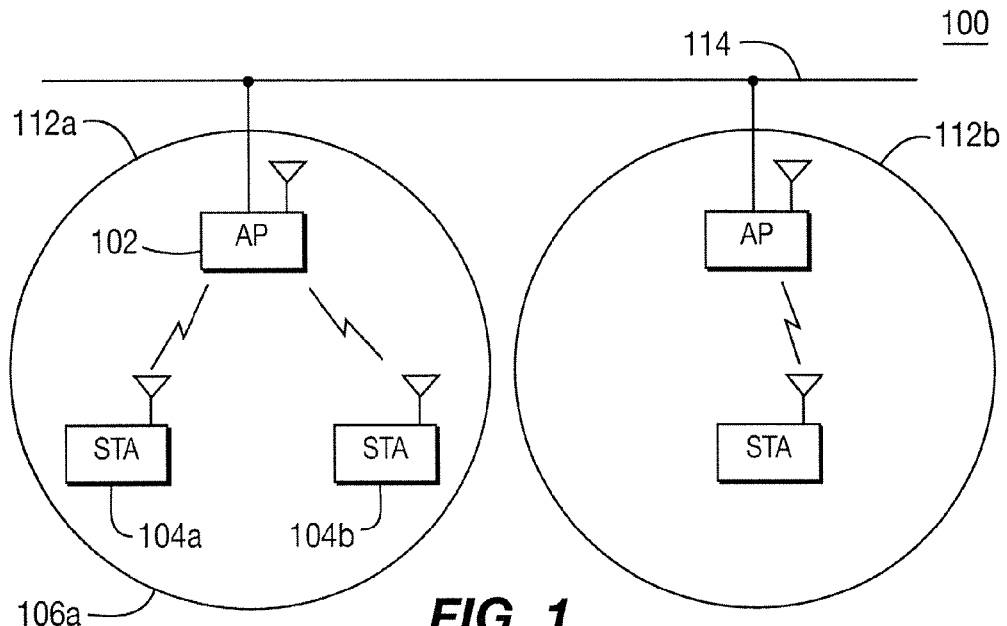
FIG. 1 shows a conventional infrastructure mode WLAN.
Figure 2:
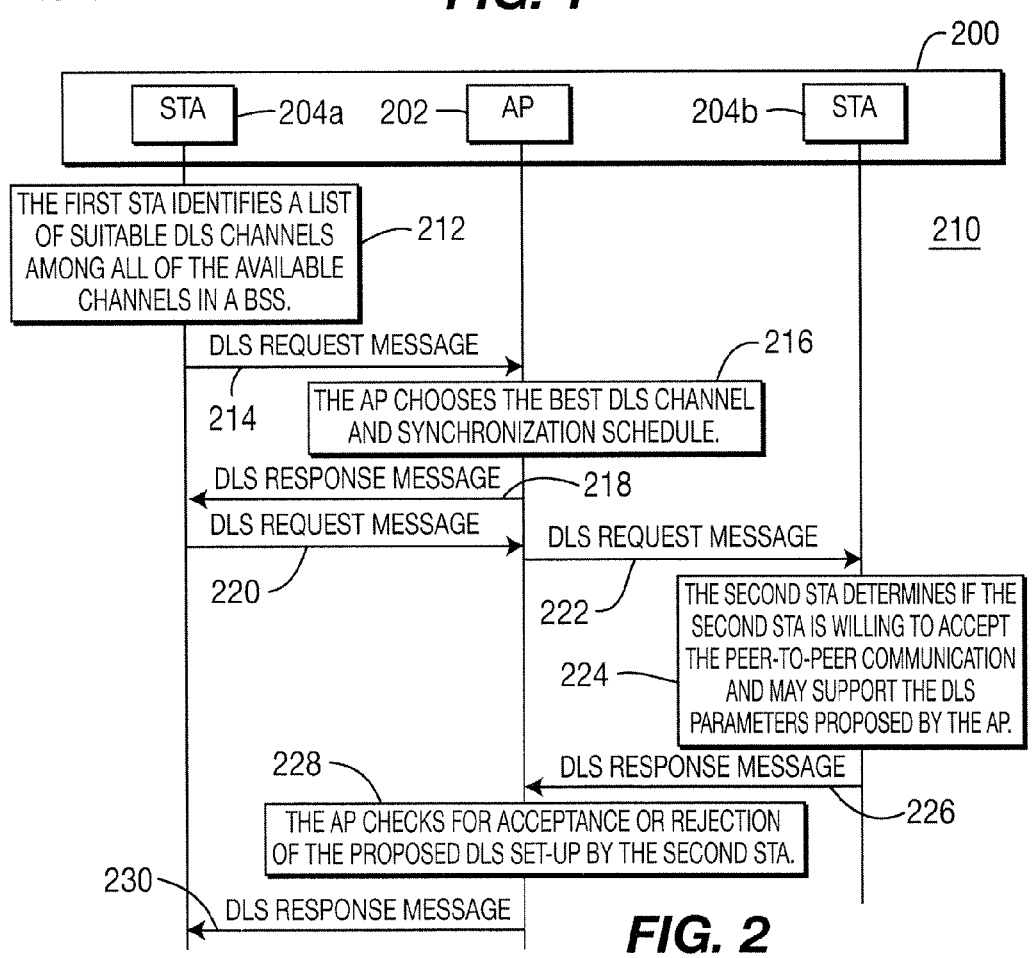
FIG. 2 shows a signaling diagram of a DLS setup procedure in a wireless communication system including an AP, a first STA and a second STA in accordance with the present invention.

FIG. 2 shows a signaling diagram of a DLS setup process 210 in a wireless communication system 200 including an AP 202, a first STA 204a and a second STA 204b in accordance with the present invention. The first STA 204a identifies a list of suitable DLS channels among all of the available channels in a BSS (step 212). The list of suitable DLS channels may be identified in many different ways as described hereinafter.

The list of suitable DLS channels may be stored in a database of the first STA 204a semi-statically. The database may be management information base (MIB). Alternatively, the list of suitable DLS channels may be set by the user manually using a user interface, such as hypertext markup language (HTML), extended markup language (XML) or equivalent user interfaces. Alternatively, the list of suitable DLS channels may be set by a network management entity remotely by using a communication protocol, such as simple network management protocol (SNMP), XML, a layer 3 (or higher) protocol, or a layer 2 protocol, (e.g., by using a layer 2 management frame).

The STA 204a, 204b may be configured to check, on a regular or triggered basis, for updates of the suitable DLS channels and related parameters contained in the STA's database. Alternatively, the STA 204a, 204b may be configured to check, on a regular or triggered basis, for updates of the list of suitable DLS channels and related parameters in a remote database.

Alternatively, the first STA 204a may generate the list by observing and evaluating the channels in the BSS. The first STA 204a observes and evaluates the channels available in the BSS based on predetermined criteria including, but not limited to, channel occupancy, interference levels or activity by other STAs on each of the channels. The first STA 204a then generates the list based on the evaluation of the channels. The first STA 204a may use dual-radios to observe and evaluate the channels. Alternatively, the first STA 204a may use non-transmission time periods on the BSS channel to evaluate other channels or use clear-to-send (CTS)-to-self and equivalent mechanisms to obtain measurement periods without interrupting its ongoing transmissions on the BSS channel.

Alternatively, the first STA 204a may determine the list of suitable DLS channels by randomly selecting channel(s) among the possible channels in the BSS.

Alternatively, the first STA 204a may obtain the list of suitable DLS channels from the AP 202. The AP 202 manages at least one DLS channel and administers policies in the BSS. The AP 202 generates a list of suitable DLS channels by using any methods described hereinbefore and sends the list containing one or more suitable DLS channels to be used in the BSS to the STAs 204a, 204b. Optionally, the list may include preference values for each or a set of entries in the list. The list of suitable DLS channels in the BSS may be signaled as part of a beacon frame, a probe response frame, an association response frame or any other frame. The frame may be a management frame, an action frame, a control frame, a data frame, or any other type of frame. The list may be sent to STAs 204a, 204b either by broadcasting/multicasting or by unicasting. Preferably, the first STA 204a obtains the list from the AP 202 during an association procedure or by soliciting the AP 202 to send the list.

In addition to the list of DLS channels, the AP 202 may send configuration information regarding multi-channel DLS policy in the BSS. The configuration information includes, but is not limited to, multi-channel DLS capability implemented in the BSS, multi-channel DLS capability enabled in the BSS and dwell times, maximum transmission times, channel access times, quality of service (QoS) settings, channel access schedules for one or more DLS channels.

The first STA 204a then sends a DLS request message to an AP 202 to initiate a DLP setup by negotiating for the DLS channel with the AP 202 and the second STA 204b (step 214). The DLS request message includes the list of suitable DLS channels proposed by the first STA 204a for a peer-to-peer communication with the second STA 204b. The list of suitable DLS channels may include a preference among the DLS channels included in the list. The preference may be indicated implicitly by the order of the channels in the list. The DLS request message may also include a switch time indicating a start time for the peer-to-peer communication on a negotiated DLS channel. The DLS request message may be used in extension with the conventional IEEE 802.11e DLS request message. In such case, the list of parameters is to be understood as an extension compared to the conventional IEEE 802.11e DLS messages.

Upon reception of the DLS request message from the first STA 204a, the AP 202 chooses the best DLS channel and synchronization schedule (step 216). The AP 202 may select the best DLS channel among the channels proposed by the first STA 204a, or may reject all the channels proposed by the first STA 204a. Alternatively, the AP 202 may maintain its own list of suitable DLS channels and compare its own list to the list proposed by the first STA 204a to select the best DLS channel. The AP 202 may observe and evaluate the channels available in the BSS based on predetermined criteria including, but not limited to, channel occupancy, interference levels or activity by STAs on each of the channels. Alternatively, the AP 202 may select the DLS channel based on pre-configuration. The AP 202 may use other information, (e.g., capability information), obtained from the first STA 204a and the second STA 204b to select the best DLS channel.

If the AP 202 selects the best DLS channel from the list proposed by the first STA 204a, the process 210 proceeds to step 222. If the AP 202 rejects the DLS channels proposed by the first STA 204a, the AP 202 sends a DLS response message to the first STA 204a (step 218). The DLS response message may include a list of DLS channels proposed by the AP 202. The DLS response message may include an alternative switch time suggested by the AP 202 in the switch time suggested by the first STA 204a is not acceptable. The DLS response message may include a synchronization schedule indicating a time schedule for the first STA 204a and the second STA 204b to switch back from the DLS channel to the BSS channel for the purpose of BSS connectivity once the DLS is setup. The DLS response message may also include the reason for the rejection.

Upon receipt of the DLS response message indicating an alternative suggestions by the AP 202 for any of the DLS parameters, (i.e., DLS channels, switch time), the first STA 204a may accept the DLS parameters proposed by the AP 202 or may terminate the DLS setup procedure. If the first STA 204a chooses to accept the alternative DLS parameters proposed by the AP 202, the first STA 204a replies to the AP 202 using another DLS request which includes the accepted DLS parameters (step 220).

Upon receipt of the second DLS request message including the accepted DLS parameters, (which have been suggested by the AP 202), or when the AP 202 accepts the original DLS request at step 216, the AP 202 sends a DLS request message to the second STA 204b (step 222). The DLS request message includes at least one of the best DLS channel selected by the AP 202, a switch time selected by the AP 202, and a synchronization schedule for the first STA 204a and the second STA 204b to switch back from the DLS channel to the BSS channel for the purpose of BSS connectivity once the DLS is setup.

The synchronization schedule may be provided by time intervals (or time periods) linked to the beacon intervals, (e.g., switch back every N beacons), a dwell time (or time periods) on the BSS channel, (e.g., remain on the BSS channel for M time units), or transmission schedule for the DLS channel, (e.g., start time, end time and transmission periods describing which time intervals the first STA and the second STA may spend on the DLS channel and which time intervals the first STA and the second STA must return to the BSS channel).

Upon receipt of the DLS request, the second STA 204b determines if the second STA 204b is willing to accept the peer-to-peer communication and may support the DLS parameters proposed by the AP 202 (step 224). The second STA 204b then sends a DLS response message indicating either acceptance or rejection to the AP 202 (step 226).

If the second STA 204b rejects the peer-to-peer communication request or any of the proposed DLS parameters, the second STA 204b sends a DLS response message indicating rejection to the AP 202. Optionally, the second STA 204b may specify the cause of the rejection. Alternatively, the second STA 204b may send suggestions for any of DLS setup parameters. If the second STA 204b accepts the proposed DLS parameters, the second STA 204b sends a DLS response message indicating acceptance to the AP 202.

Upon reception of the DLS response from the second STA 204b, the AP 202 checks for acceptance or rejection of the proposed DLS set-up by the second STA 204b and sends a DLS response message to the first STA 204a (steps 228, 230). If the second STA 204b rejected the DLS set-up, the AP 202 sends a DLS response message indicating rejection to the first STA 204a. Optionally, the AP 202 may forward the reason for rejection or alternative suggestions made by the second STA 204b. Upon reception of the DLS response message indicating rejection, the procedure 200 terminates. The first STA 204a may re-initiate the DLS setup procedure 200 by returning to step 212.

If the second STA 204b accepted the DLS set-up, the AP 202 sends a DLS response message indicating acceptance to the first STA 204a. The first STA 204a and the second STA 204b then execute the key exchange procedure according to IEEE 802.11i, switch to the negotiated DLS channel at the specified channel switch time, and return to the BSS channel at the time periods (or time intervals) as specified in the synchronization schedule.

In accordance with another embodiment of the present invention, instead of initiating a procedure for setting up a DLS link via the DLS channel, the first STA 204a and the second STA 204b may first establish a DLS link via a conventional BSS channel. Once the first STA 204a and the second STA 204b have setup a DLS link on the BSS channel, one of the STAs 204a, 204b may request the other STA for switch to a DLS channel. Once the first STA 204a and the second STA 204b agree on a DLS channel, one of them notifies the AP 202, which may agree or not. Once the AP 202 agrees on the switch of the channel, the first STA 204a and the second STA 204b perform a peer-to-peer communication via the negotiated DLS channel.

In selecting the best DLS channel, the AP 202 may implement different decision policies regarding its preference of the DLS channels to be used. For example, the AP 202 may allocate each new requested DLS link to a different DLS channel, or allocate a subsequently requested DLS link to a DLS channel that is already allocated for another pair of STAs.

The DLS channel may be a sub-channel of the BSS channel. For example, with a 40 MHz bandwidth BSS channel, STAs may choose to set-up a DLS channel with a 20 MHz bandwidth similar to the IEEE 802.11n legacy support mode.

Although the features and elements of the present invention are described in the preferred embodiments in particular combinations, each feature or element can be used alone without the other features and elements of the preferred embodiments or in various combinations with or without other features and elements of the present invention.

What is claimed is:

1. A method for performing peer-to-peer wireless communication between a first station (STA) and a second STA, the method comprising:
   the first STA establishing a direct link setup (DLS) link with the second STA for performing peer-to-peer communication with the second STA on a basic service set (BSS) channel, which is shared by all stations and an access point (AP) in a BSS;
   the first STA negotiating directly with the second STA through the DLS link established on the BSS channel for switching a channel for the DLS link to a DLS channel which is different from the BSS channel; and
   the first STA performing peer-to-peer communication with the second STA on the DLS channel, wherein the first STA switches back and forth between the DLS channel and the BSS channel in accordance with an agreed synchronization schedule for maintaining connectivity with an access point (AP) while performing peer-to-peer communication on the DLS channel.

2. The method of claim 1 wherein the first STA sends a DLS request message including DLS parameters which include a list of at least one DLS channel selected by the first STA and a synchronization schedule indicating a time schedule for the first STA to switch back to the BSS channel once a DLS link is setup.

3. The method of claim 2 wherein the DLS parameters include a switch time indicating a start time for a DLS link.

4. The method of claim 2 wherein the DLS request message includes a preference of a DLS channel in the list on a condition that at least two DLS channels are included in the list.

5. The method of claim 2 wherein the list is semi-statically programmable.

6. The method of claim 5 wherein the list is stored in a management information base (MIB) of the first STA.

7. The method of claim 2 wherein the list is programmable by a user manually.

8. The method of claim 2 wherein the list of DLS channels is programmable by using a communication protocol from a remote location.

9. The method of claim 8 wherein the communication protocol includes at least one of small network management protocol (SNMP), extended markup language (XML), a layer 3 protocol, or a layer 2 protocol.

10. The method of claim 2 wherein the first STA obtains the list from the AP.

11. The method of claim 10 wherein the first STA obtains the list of DLS channels via one of broadcasting, multicasting and unicasting.

12. The method of claim 10 wherein the list of DLS channels is included in one of a beacon frame, a probe response frame and an association response frame.

13. The method of claim 2 wherein the first STA obtains the list by observing and evaluating channels available in the BSS.

14. The method of claim 13 wherein the first STA evaluates the channels based on at least one of channel occupancy, interference levels of each channel, or activity by other STAs in each channel.

15. The method of claim 13 wherein the first STA uses dual-radio for evaluating the channels.

16. The method of claim 13 wherein the first STA uses non-transmission time periods on the BSS channel to evaluate other channels.

17. The method of claim 13 wherein the first STA uses clear-to-send (CTS)-to-self to obtain a period to evaluate the channels.

18. The method of claim 2 wherein the first STA generates the list by randomly drawing among available channels in the BSS.

19. The method of claim 2 wherein the DLS request is an extension of IEEE 802.11e DLS request.

20. The method of claim 2 further comprising:
the first STA receiving a DLS response message including alternative DLS parameters which include a list of at least one DLS channel.

21. The method of claim 20 wherein the alternative DLS parameters include at least one of a switch time indicating a start time for DLS link and a synchronization schedule indicating a time schedule for the first STA and the second STA to switch back to the BSS channel once a DLS link is setup.

22. The method of claim 21 further comprising:
the first STA sending another DLS request message including DLS parameters selected based on the alternative DLS parameters.

23. The method of claim 1 wherein the first STA receives configuration information regarding multi-channel DLS policy in the BSS from the AP.

24. The method of claim 23 wherein the configuration information includes at least one of multi-channel DLS capability implemented in the BSS, multi-channel DLS capability enabled in the BSS, and at least one of dwell times, maximum transmission times, channel access times, quality of service (QoS) settings, or channel access schedules for a DLS channel.

25. The method of claim 1 wherein the DLS channel is a sub-channel of the BSS channel.

26. A station (STA) configured to support peer-to-peer wireless communication, the STA comprising:
a transceiver; and
a controller configured to establish a direct link setup (DLS) link with a second STA for performing peer-to-peer communication with the second STA on a basic service set (BSS) channel, which is used by all stations and an access point (AP) in a BSS, negotiate directly with the second STA through the DLS link on the BSS channel for switching a channel for the DLS link to a DLS channel which is different from a BSS channel and switch back and forth between the DLS channel and the BSS channel in accordance with an agreed synchronization schedule for maintaining connectivity with an access point (AP) while performing peer-to-peer communication on the DLS channel.

27. The STA of claim 26 wherein the controller is configured to send a DLS request message including DLS parameters which include a list of at least one DLS channel selected by the STA and a synchronization schedule indicating a time schedule for the STA to switch back to the BSS channel once a DLS link is setup.

28. The STA of claim 27 wherein the DLS parameters include a switch time indicating a start time for a DLS link.

29. The STA of claim 27 wherein the DLS request message includes preference of a DLS channel in the list on a condition that at least two DLS channels are included in the list.

30. The STA of claim 27 wherein the list is semi-statically programmable.

31. The STA of claim 30 wherein the list is stored in a management information base (MIB) of the source STA.

32. The STA of claim 27 wherein the list is programmable by a user manually.

33. The STA of claim 27 wherein the list of DLS channels is programmable by using a communication protocol from a remote location.

34. The STA of claim 33 wherein the communication protocol includes at least one of small network management protocol (SNMP), extended markup language (XML), a layer 3 protocol, or a layer 2 protocol.

35. The STA of claim 27 wherein the controller obtains the list from the AP.

36. The STA of claim 35 wherein the list of DLS channels is obtained via one of broadcasting, multicasting and unicasting.

37. The STA of claim 35 wherein the list of DLS channels is included in one of a beacon frame, a probe response frame and an association response frame.

38. The STA of claim 27 wherein the controller obtains the list by observing and evaluating channels available in the BSS.

39. The STA of claim 38 wherein the controller evaluates the channels based on at least one of channel occupancy, interference levels of each channel, or activity by other STAs in each channel.

40. The STA of claim 38 wherein the controller uses dual-radio for evaluating the channels.

41. The STA of claim 38 wherein the controller uses non-transmission time periods on the BSS channel to evaluate other channels.

42. The STA of claim 38 wherein the controller uses clear-to-send (CTS)-to-self to obtain a period to evaluate the channels.

43. The STA of claim 27 wherein the controller generates the list of DLS channels by randomly drawing amongst available channels in the BSS.

44. The STA of claim 27 wherein the DLS request is an extension of IEEE 802.11e DLS request.

45. The STA of claim 27 wherein the controller receives a DLS response message including alternative DLS parameters which include a list of at least one DLS channel.

46. The STA of claim 45 wherein the alternative DLS parameters include at least one of a switch time indicating a start time for DLS link suggested by the AP and a synchronization schedule indicating a time schedule for the STA to switch back to the BSS channel once a DLS link is setup.

47. The STA of claim 45 wherein the controller is configured to send another DLS request message including DLS parameters selected based on the alternative DLS parameters.

48. The STA of claim 26 wherein the controller receives configuration information regarding multi-channel DLS policy in the BSS from an access point (AP).

49. The STA of claim 48 wherein the configuration information includes at least one of multi-channel DLS capability implemented in the BSS, multi-channel DLS capability enabled in the BSS, and at least one of dwell times, maximum transmission times, channel access times, quality of service (QoS) settings and channel access schedules for a DLS channel.

50. The STA of claim 26 wherein the DLS channel is a sub-channel of the BSS channel.

\* \* \* \* \*